United States Patent
Chin et al.

(10) Patent No.: US 9,726,558 B2
(45) Date of Patent: Aug. 8, 2017

(54) METHOD AND DEVICE FOR PRESSURE SENSING

(75) Inventors: Sanghoon Chin, Ecublens (CH); Etienne Rochat, Valeyres sous Ursins (CH)

(73) Assignee: OMNISENS SA, Morges (CH)

( * ) Notice: Subject to any disclaimer, the term of this patent is extended or adjusted under 35 U.S.C. 154(b) by 0 days.

(21) Appl. No.: 14/407,644

(22) PCT Filed: Jun. 13, 2012

(86) PCT No.: PCT/EP2012/061200
§ 371 (c)(1),
(2), (4) Date: Apr. 16, 2015

(87) PCT Pub. No.: WO2013/185813
PCT Pub. Date: Dec. 19, 2013

(65) Prior Publication Data
US 2015/0219509 A1    Aug. 6, 2015

(51) Int. Cl.
*G01L 1/24* (2006.01)

(52) U.S. Cl.
CPC .............. *G01L 1/246* (2013.01); *G01L 1/247* (2013.01)

(58) Field of Classification Search
CPC ......... G01L 1/246; G01L 1/247; G01L 37/18; G01D 5/344; G01D 5/35383; G01D 5/35303; H01S 3/0675; G01B 7/18
USPC ................ 73/800; 385/37, 364, 11–12; 250/227.14; 356/73.1; 374/161; 372/102, 6
See application file for complete search history.

(56) References Cited

U.S. PATENT DOCUMENTS

| | | | |
|---|---|---|---|
| 6,363,180 B1 * | 3/2002 | Yamate | G01D 5/344 356/35.5 |
| 2006/0197012 A1 | 9/2006 | Udd et al. | |
| 2010/0329602 A1 * | 12/2010 | Shah | G01D 5/35303 385/13 |
| 2012/0086934 A1 * | 4/2012 | Digonnet | G01D 5/35316 356/32 |

FOREIGN PATENT DOCUMENTS

WO    00/72058 A2    11/2000

OTHER PUBLICATIONS

International Search Report for PCT/EP2012/061200 dated Apr. 8, 2013.
Kwang-Yong Song, et al., "All-optical dynamic grating generation based on Brillouin scattering in polarization maintaining fiber", Proceedings of Spie, Apr. 14, 2008, pp. 70043T-70043T-4, vol. 7004.
Weiwen Zou, et al. "Complete discrimination of strain and temperature using Brillouin frequency shift and birefringence in a polarization-maintaining fiber", Optics Express, Feb. 2, 2009, p. 1248, vol. 17, No. 3.

* cited by examiner

*Primary Examiner* — Harshad R Patel
*Assistant Examiner* — Brandi Hopkins
(74) *Attorney, Agent, or Firm* — Pearne & Gordon LLP

(57) ABSTRACT

A method for performing distributed pressure sensing including the steps of, forming a grating in a birefringent fiber, measuring the birefringence distribution along the length of the birefringent fiber, and determining pressure present along the length of the fiber using the measured the birefringence distribution. The invention also relates to a corresponding sensing device.

17 Claims, 3 Drawing Sheets

METHOD AND DEVICE FOR PRESSURE SENSING

FIELD OF THE INVENTION

The present invention relates to a method and device for performing pressure sensing; and in particular to a method and device for performing distributed pressure sensing which uses birefringent fiber(s).

DESCRIPTION OF RELATED ART

Optical fiber sensors have been extensively developed for measuring hydrostatic pressure in harsh environments such as oil/gas pipeline and downhole applications.

To date, fiber-optic pressure sensing techniques based on fiber Bragg grating and fiber birefringence are used.

A Fiber Bragg grating (FBG) is made of periodic modulation of refractive index in fibers and acts as a light reflector.

Fiber Bragg gratings (FBGs) diffract light over a certain frequency range to provide a spectrum; the spectrum has a bell-shape and the central frequency of the spectrum is referred to as fiber Bragg grating frequency $v_{Bragg}$. Fiber Bragg gratings (FBGs) have been extensively implemented as point and/or quasi-distributed pressure sensor since the FBG frequency $v_{Bragg}$ is inversely proportional to externally induced strain $\epsilon$, $$V_{Bragg} = \frac{c}{2n(\varepsilon)\Lambda}, \tag{1}$$

wherein c is light velocity in vacuum, n is refractive index of the fiber and $\Lambda$ is the periodicity of refractive index modulation in FBGs, referred to as physical pitch.

It is possible, for instance using a piston mechanism, to couple hydrostatic pressure to a longitudinal movement which is measured by the FBG. Alternatively, a FBGs can be secured onto a material having a large Poisson module so that the pressure change can elongate or compress the material, hence elongating or compressing the FBGs. This is a point sensor since the gratings are cascaded in a discrete manner with a periodicity over a length of optical fiber so that the ambient pressure is monitored at only positions where FBGs are present Standard fiber means that the refractive index is identical over any direction due to symmetry of the cylindrical structure of the fiber. Birefringent fibers are fibers in which the refractive index $n_x$ of the fiber along a horizontal axis (x-axis) is slightly different to the refractive index $n_y$ of the fiber along a vertical axis (y-axis). The two axis (horizontal axis (x-axis) and vertical axis (y-axis)) of the fiber are referred to as two primary axis in the birefringent fiber, where horizontal and vertical means orthogonal directions.

Light is an electro-magnetic wave, so there are electric field and also magnetic field propagating together. Polarization of light is simply the direction of the electric field oscillation. Two primary polarization modes means that the electric field of the light is aligned along the x- or y-axis of the birefringent fiber.

Sensing techniques based on Fiber birefringence usually compare propagation properties through a birefringent fiber of two orthogonal primary polarization modes. The two orthogonal polarization modes experience differential phase shift after propagating through the birefringent fibers due to the refractive index difference ($n_x - n_y$).

The fiber birefringence B is used as a key element for pressure sensing since the fiber birefringence is inversely proportional to ambient pressure with a coefficient $C_{Bi}$, given as:

$$C_{Bi} = \frac{dB}{dP}, \tag{2}$$

wherein $B = \Delta n = n_x - n_y$ ($n_x$ and $n_y$ being effective refractive indexes along two primary axes x, y which are orthogonal to each other), and $\Delta n$ is the difference between the effective refractive indexes $n_x$ and $n_y$.

So, an optical path length, which is the product of the physical length L of the fiber and the effective refractive index n of the fiber, is different between two primary axis (i.e. $n_x \cdot L$ and $n_y \cdot L$ are different since the effective refractive indexes $n_x$ and $n_y$, along two primary axes x, y are different) so that the light experiences different phase shift between x-axis and y-axis.

The relative optical phase between the two modes at the end of the fiber has a linear dependence on fiber birefringence. Since fiber birefringence changes with pressure, a variation in pressure can be measured by monitoring the relative optical phase between the two modes.

A fibre laser cavity based on birefringent fiber can be used as another implementation of pressure monitoring. The optical waves in the birefringent cavity propagate according to two primary polarisation modes, which optical frequencies are determined by the refractive index $n_x$ and $n_y$, respectively; one optical wave is polarized along one of two primary axis and the other wave is polarized along the other primary axis. These two waves may interfere at an exit of the cavity, generating a beat signal at frequency which is equal to the frequency difference between the frequencies of the two waves. Due to the fiber birefringence sensitivity to the pressure, the frequency of the beat signal shifts proportionally with respect to the pressure change.

However, any change in the beat signal frequency or in the phase difference between two orthogonal modes is the product of overall integration over the entire length of the birefringent fibers; this is a point sensor.

To date, fiber-optic pressure sensing techniques based on fiber Bragg grating and fiber birefringence can provide a high measurement resolution, but their implementations are still restricted to point sensing.

Brillouin scattering in fibers has shown a possibility to realize a distributed pressure sensing system (e.g. to measure pressure distribution along flowlines). The central frequency of Brillouin scattering resonance in fibers, referred to as Brillouin shift of fiber is given as:

$$v_B = \frac{2nV_a}{c} \cdot v_p, \tag{3}$$

wherein $V_a$ is the velocity of an acoustic wave in the fiber, $v_P$ is an incident pump frequency and c is light velocity in vacuum. The effective refractive index n of the fiber has a linear dependence on pressure. Thus the Brillouin frequency $v_B$ shifts with respect to the pressure so that the hydrostatic pressure distribution along a sensing fiber can be computed by measuring distributed Brillouin frequency over the fiber.

However, the Brillouin frequency sensitivity to hydrostatic pressure is inherently poor, of the order of 0.074 MHz/bar, which makes it useless for most applications. For example, such Brillouin scattering measuring techniques cannot be used for oil reservoir management where pressure sensitivity around 0.1 bar is required.

It is possible to add a coating on the fiber, which transforms radial strain into longitudinal strain so that hydrostatic pressure is eventually converted into axial strain. This way the sensitivity of the Brillouin measurement is improved by a large factor (for example as large as nearly 5) resulting in the enhanced sensitivity up to 0.340 MHz/bar. The design and the fabrication of such special coating are extremely difficult and costly.

Thus Brillouin scattering in fibers was used as a promising solution to measure pressure distribution along flowlines, but this scheme requires a transducer (a specifically designed coating) to enhance the Brillouin effect sensitivity to pressure, making it economically not viable and industrially not practical.

There is a need in the art for a high-resolution distributed pressure measurement device and method which does not require the use of an expensive coating on a sensing fiber to transform radial strain into longitudinal strain.

BRIEF SUMMARY OF THE INVENTION

According to the invention, these aims are achieved by means of a method of performing distributed pressure sensing comprising the steps of, forming a grating in a birefringent fiber, measuring the birefringence distribution along the length of the birefringent fiber, and determining distributed pressure present along the length of the fiber using the measured birefringence distribution.

The method of the present invention enables distributed pressure sensing using gratings and birefringence in fibers. Fiber birefringence is sensitive to pressure variation without the need of any transducers and the grating generated in birefringent fibers is used as a means of performing the distributed birefringence measurement.

This invention provides distributed pressure measurement with significantly enhanced pressure sensitivity, by a factor possibly >100, compared to the prior art method which uses classic Brillouin scattering, but without the need for a transducer (e.g. a specifically designed coating).

A grating is made of a periodic modulation of refractive index along an optical waveguide such as an optical fiber; and can diffract light which propagates through the optical fiber when the optical frequency of the light satisfies Bragg conditions given by Eq. (1). For instance, when the grating is implemented in an optical fiber the grating is referred to as fiber Bragg grating (FBG) and the FBG frequency so that a change in the effective refractive index of the optical fiber will lead to a shift in FBG frequency.

The spatial resolution of pressure measurements along a fiber can be also improved using the method of the present invention, while preserving the measurement resolution and accuracy, compared to the prior art methods.

The step of forming a grating in a birefringent fiber may comprise forming a static grating in a birefringent fiber.

The step of forming a static grating in a birefringent fiber may comprise providing a birefringent fiber with a plurality of regions wherein the refractive index of the fiber is permanently modulated.

The method may comprise the steps of, providing a pulsed probe signal, polarized along a primary axis, to the birefringent fiber, scanning the frequency of the pulsed probe signal to measure a first distributed frequency at which maximum scattering is taking place; changing the polarization of the pulsed probe signal to the orthogonal state with respect to the previous state; scanning the frequency of the pulsed probe signal to the measure a second distributed frequency at which maximum scattering is taking place; measuring the difference between the first and second distributed frequencies to determine the birefringence of the birefringent fiber; repeating the above steps one or more times, and detecting a change in pressure applied to the birefringent fiber by detecting a change in the difference between the first and second distributed frequencies.

The method may comprise the steps of, providing in the birefringent fiber a first probe signal, polarized along a first primary axis, scanning the frequency of the first probe signal to the measure a first frequency at which maximum scattering is taking place, providing in the birefringent fiber a second probe signal, polarized along a second primary axis which is orthogonal to the first primary axis, scanning the frequency of the second probe signal to measure a second frequency at which maximum scattering is taking place; measuring the difference between the first and second frequencies to determine the birefringence of the birefringent fiber, detecting a change in pressure applied to the birefringent fiber by detecting a change in the difference between the first and second distributed frequencies.

The step of forming a grating in a birefringent fiber may comprise forming a dynamic grating in a birefringent fiber.

The dynamic grating may be formed by Brillouin scattering.

The step of forming a dynamic grating in a birefringent fiber may comprise, counter propagating a first pump signal and a second pump signal in the birefringent fiber so that the first pump signal and a second pump signal interact by stimulated Brillouin scattering within the birefringent fiber, wherein the difference in between the frequencies of the first pump signal and a second pump signal is within the range of the Brillouin frequency shift±an offset, wherein the offset is equal to the spectral width of the stimulated Brillouin scattering within the birefringent fiber. The spectral width of stimulated Brillouin scattering between a pump and probe signals when they are both continuous waves is typically in the range of 30 MHz in standard optical fibers.

The difference between the frequencies of the first and second pump signals is preferably equal to a Brillouin frequency shift of the birefringent fiber.

The first pump signal and second pump signal may be polarized along a first primary axis of polarization.

The first pump signal and second pump signal may be continuous. The frequency or phase of the first and second continuous pump signals may be correlated to provide a localized dynamic grating.

The first pump signal and second pump signal may be pulsed.

The probe signal may be pulsed. The probe signal may be continuous.

The method may further comprise the step of providing a probe signal, polarized along a second primary axis which is orthogonal to the first primary axis, in the birefringent fiber to measure the frequency of the probe signal at which maximum scattering is taking place.

The method may further comprising the step of scanning the frequency of the probe signal to detect shift in the frequency at which maximum scattering is taking place, wherein the shift in frequency is representative of a pressure change.

The probe signal may be temporally compressed to achieve higher spatial resolution.

The step of forming a dynamic grating may comprise co-propagating a first and second pump signal in the birefringent fiber, reflecting the first and second pump signal using a reflecting means to provide first and second reflected signals, interacting the first and second pump signals with the first and second reflected signals to generate a dynamic Brillouin grating along the birefringent fiber, wherein the difference in between the frequencies of a first pump signal and a second pump signal is within the range of the Brillouin frequency shift±an offset, wherein the offset is equal to the spectral width of the stimulated Brillouin scattering within the birefringent fiber.

Preferably the difference between the frequencies of the first and second pump signals is equal to a Brillouin frequency shift of the birefringent fiber.

The method may further comprise the steps of performing distributed temperature and/or strain measurements using the birefringent fiber; and subtracting the distributed temperature and/or strain measurements from the distributed pressure measurement.

The method may comprise the steps of providing a birefringent fiber which is configured to be insensitive to ambient temperature fluctuations, so the thermal cross sensitivity can be mitigated, and wherein the fiber is further configured such that the strain sensitivity of the birefringent fiber is mitigated.

The method may further comprise the step of modifying the birefringent fiber so that it is insensitive to ambient temperature fluctuations, so the thermal cross sensitivity can be mitigated. For example the birefringent fibers can be specially designed so that the thermal response along each axis is identical mitigating thermal cross sensitivity.

The method may further comprise the step of providing a birefringent fiber which is configured such that the strain sensitivity of the birefringent fiber is mitigated.

According to a further aspect of the present invention there is provided a sensing device for performing distributed pressure sensing comprising, a birefringent fiber; a means for forming a grating in the birefringent fiber; a means for measuring birefringence distribution along the length of the birefringent fiber, and a means for determining distributed pressure present along the length of the birefringent fiber using the measured birefringence distribution.

The birefringent fiber may be chemically doped so that it has improved sensitivity to pressure. For instance, birefringent fibers can be specially designed, so that the refractive index in one $n_x$ of two primary axes is immune to the pressure while that the refractive index $n_y$ along the other primary axis is sensitive to the pressure, or vice versa so that the birefringence sensitivity to the pressure can be enhanced.

The birefringent fiber may be chemically doped with for example Boron. The structural properties of the birefringent fiber may be configured so that the birefringent fiber has improved sensitivity to pressure; for example the birefringent fiber may be configured to be a micro structured fiber. The birefringent fiber may be configured to comprise cavities; the cavities may be longitudinal arranged along the length of the birefringent fiber.

BRIEF DESCRIPTION OF THE DRAWINGS

The invention will be better understood with the aid of the description of an embodiment given by way of example only, and illustrated by the figures, in which.

DETAILED DESCRIPTION OF POSSIBLE EMBODIMENTS OF THE INVENTION

Figure 1:
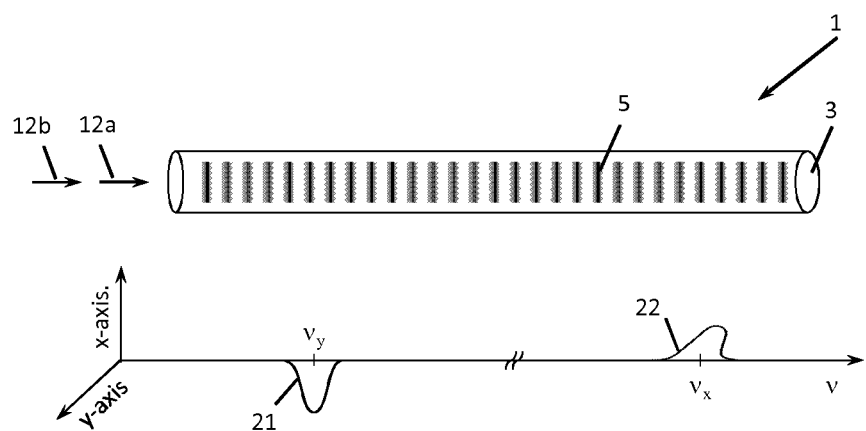
FIG. 1 provides a graphical illustration of a system according to a first embodiment of the present invention suitable for the implementation of a method according to a first embodiment of the present invention.

FIG. 1 illustrates a system 1 according to a first embodiment of the present invention, for performing distributed pressure sensing according to a method according to a first embodiment of the present invention. The system 1 comprises a birefringent fiber 3 in which there is written (i.e. generated) a static grating 5. The grating 5 can scatter light within certain spectral bands 21, 22 and the scattered light with maximum efficiency will have one of two different frequencies $v_x$, $v_y$; maximum scattering of light will occur at these frequencies $v_x$, $v_y$.

The birefringent sensing fiber 3 has a first refractive index $n_x$ along a horizontal axis (x-axis) and a second refractive index $n_y$ along a vertical axis (y-axis). The two axes (horizontal axis (x-axis) and vertical axis (y-axis)) of the birefringent fiber 3 are referred to as two primary axes in the birefringent fiber 3. Light which is configured such that its electrical field is aligned along the x-axis is polarized along the x-axis and light which is configured such that its electrical field is aligned along the y-axis is polarised along the y-axis. The frequency of the light which is scattered by the static grating 5 will have two distinct frequencies $v_x$, $v_y$ depending on the polarization of the light incident on the static grating 5.

The principle of operation of the system 1 relies on two features of fiber birefringence:

Firstly, the frequency difference between the two distinct frequencies $v_x$, $v_y$ is representative of the birefringence of the birefringent fiber 3.

Secondly, the birefringence of the birefringent fiber 3 is sensitive to pressure, so that a change in birefringence of the birefringent fiber 3 will indicate a change in pressure. This is due to the fact that the effective refractive indexes $n_x$ and $n_y$ of birefringent fiber 3 differ according to pressure.

Pressure applied to the birefringent fiber 3 causes the two distinct frequencies $v_x$, $v_y$ to shift by a different amount, so that the difference between the two distinct frequencies $v_x$, $v_y$ changes. A change in the difference between the two distinct frequencies $v_x$, $v_y$ can thus be used to compute a change in the pressure which is applied to the birefringent fiber 3, according to the following equation:

$$\frac{d(v_x - v_y)}{dP} = \frac{c}{2n\Lambda} \frac{d(\Delta n)}{dP}, \quad (4)$$

wherein $d(\Delta n)/dP$ is a linear coefficient depending on fibers.

To measure shifts in the two distinct frequencies $v_x$, $v_y$ distributed measurement of birefringence along the entire length of the birefringent fiber 3 must be taken.

To realize distributed measurement of birefringence along the entire length of the birefringent fiber 3, two separate measurements of distributed scattering must be taken; specifically, a first measurement of distributed scattering along x-axis and a second measurement of distributed scattering along the y-axis, must be taken.

Figure 4:
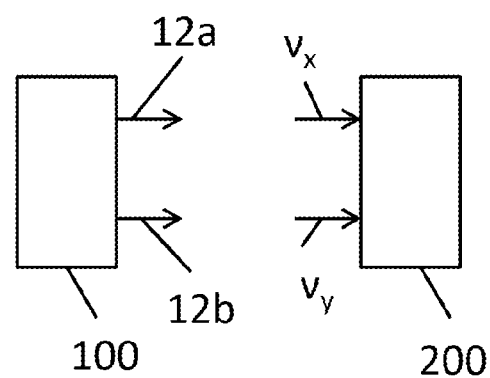
FIG. 4 is a schematic showing a signal generator and a processor of the present invention.

The distribution of the scattering can be obtained by launching a first pulsed signal 12a by a signal generator 100 (FIG. 4), which is polarized along the x-axis, into the birefringent fiber 3; scanning the frequency of the first pulsed signal to find the frequency $v_x$ at which the maximum scattering is taking place. Following this a second pulsed signal 12b, which is polarized along the y-axis, is launched by the signal generator 100 into the birefringent fiber 3; the frequency of the second pulsed signal is scanned to find the frequency $v_y$ at which the maximum scattering is taking place. The scanning of the first and second pulsed signals 12a,b ensure that the frequencies $v_y$, $v_x$ are distributed. Each of the first and second pulsed signals 12a,b are polarized by a linear polarizing means (not shown) before they are launched in to the birefringent fiber 3.

Once the distributed frequencies $v_x$, $v_y$ are determined, they are subtracted by a processor 200 (FIG. 4) to obtain the difference between the distributed frequencies $v_x$, $v_y$; the difference between the distributed frequencies $v_x$, $v_y$ reflects the distribution birefringence of birefringent fiber 3. Since the birefringence of the birefringent fiber 3 is proportional to pressure, the measured magnitude of birefringence indicates the magnitude of pressure distributed along the birefringent fiber 3.

Any type of grating could be implemented in the birefringent fiber 3. To date, several different techniques have been developed to create gratings in fibers, from static fiber Bragg gratings to dynamic gratings. Static long fiber Bragg grating can be considered as a most straightforward solution to implement gratings along a fiber or a portion of the fiber, since the grating can be simply written in the fiber by illuminating an interference pattern of an intense light to the fiber. In the system 1 shown in FIG. 1 the grating 5 provided in the birefringent fiber 3 is a static long fiber Bragg grating, wherein the grating 5 is permanently written along a portion or the entire length of a birefringent fiber 3 by means well known in the art.

Besides static fiber Bragg gratings which are permanently implemented along a birefringent fiber 3, dynamic gratings could be also generated in the birefringent fiber 3 of the sensing system 1. Dynamic gratings are gratings which are temporally generated using optical interactions between two or more optical waves through a wide set of physical mechanisms such as stimulated Brillouin scattering, nonlinear Kerr effects, gain modulation, synthesis of optical coherence function and any other optical interactions or physical phenomena that can induce a periodic modulation of the effective refractive index along the fiber. Thus in the absence of optical interaction the dynamic grating in the fiber vanishes. The optical properties of the dynamic grating can be controllable by changing the optical properties of the optical waves involved in the optical interaction. For this reason, such grating is referred to as dynamic grating.

Figure 2:
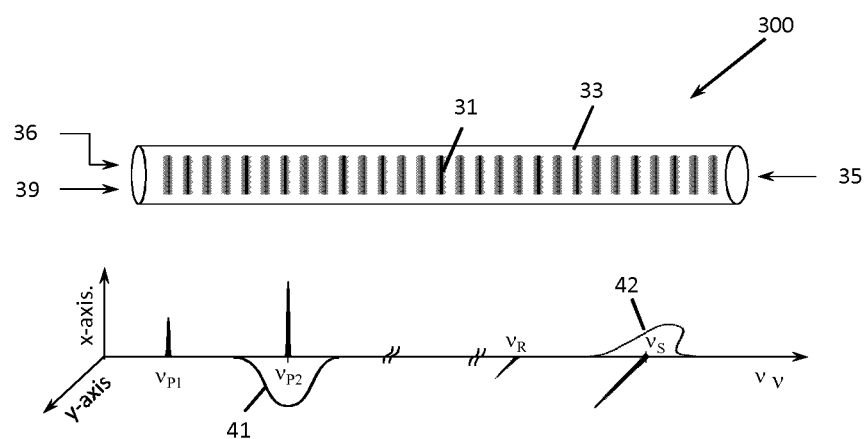
FIG. 2 provides a graphical illustration of a system according to a second embodiment of the present invention suitable for the implementation of a method according to a second embodiment of the present invention.

FIG. 2 illustrates a sensing system 300 according to a second embodiment of the present invention suitable for the implementation of a method according to a second embodiment of the present invention. In the system 300 a dynamic Brillouin grating 31 is implemented in a birefringent fiber 33.

The dynamic Brillouin grating 31 is implemented using the following steps: A first pump signal 35 and a second pump signal 36 are counter propagated (i.e. propagate in opposite directions) along the birefringent fiber 33.

The first pump signal 35 is configured to have a frequency $v_{P1}$ and the second pump signal 36 is configured to have a frequency $v_{P2}$. The difference between the frequencies of the first and second pump signals $v_{P1}$, $v_{P2}$ is preferably equal to the Brillouin frequency shift of the birefringent fiber 33 i.e. $v_B = v_{P2} - v_{P1}$. In such conditions, the refractive index in the fiber is periodically modulated due to electrostriction phenomenon through the SBS process between the two pump signals so that a grating as long as the length of the birefringent fiber is generated in the fiber by the SBS process. Therefore this grating is referred to as dynamic Brillouin grating. The grating 31 can scatter light within certain spectral bands 41, 42 and the scattered light with maximum efficiency will have one of two different frequencies $v_{P2}$, $v_S$; maximum scattering of light will occur at these frequencies $v_{P2}$, $v_S$.

The first and second pump signals 35, 36 are linearly polarized along the x-axis before they are launched into the birefringent fiber 33. The first and second pump signals 35, 36 can be linearly polarized by means of a linear polarizer.

It will be understood that the difference between the frequencies of the first and second pump signals 35, 36 could be equal to the Brillouin frequency shift of the birefringent fiber 33 or anywhere within the range of the Brillouin frequency shift of the birefringent fiber+−the spectral width of the stimulated Brillouin scattering within the birefringent fiber 33.

The first and second pump signals 35, 36 will interact to result in Stimulated Brillouin Scattering (SBS). The optical interaction of the first and second pump signals 35, 36 during SBS result in the generation of the dynamic Brillouin grating 31.

Next a pulsed probe signal 39 is provided in the fiber 33. The pulsed probe signal 39 is polarized along the y-axis (i.e. orthogonal to the x-axis along which the first and second pulsed signals 35, 36 are polarized). The probe signal 39 is configured to have a frequency which satisfies the following condition:

$$v_B = \frac{2V_a}{c} n_x v_{P2}^x = \frac{2V_a}{c} n_y v_S^y, \quad (5)$$

wherein $n_x$ and $n_y$ are the effective refractive indexes of the birefringent fiber 33 along the x and y axes respectively; $v^{x, y}$ represents the state of polarization of the first and second pump signals 35, 36 and $V_a$ is sound velocity in the birefringent fiber 33. When the probe signal 39 satisfies this condition then the dynamic Brillouin grating 31 will scatter the probe signal 39.

The frequency of the probe signal 39 is scanned to measure the scattering along length of the birefringent fiber 33. The frequency of the probe signal 39 at which the maximum scattering is taking place (i.e. frequency $(v_s)$) is identified.

The frequency of the probe signal $v_s$ at which the maximum scattering is taking place is determined, according to:

$$v_S = \left(1 + \frac{\Delta n}{n}\right) v_{P2}, \quad (6)$$

wherein $\Delta n$ is the fiber birefringence, n is refractive index of the fiber and $v_{P2}$ is the frequency of the second pump signal.

Since the frequency of the second pump signal is fixed during operation of sensing, it can be clearly seen in Equation (6) that the frequency difference Δv (Δv=$v_s$−$v_{P2}$) between the second pump signal 36 frequency $v_{P2}$ and the frequency at which maximum scattering is taking place $v_g$, has a linear dependence on the fiber birefringence Δn. So change in the frequency difference Δv between the frequency of the probe signal at which the maximum scattering is taking place $v_s$ and the frequency of the second pump signal $v_{P2}$, will reflect a change in the birefringence (delta n) of the fiber 3, which in turn reflects a change in pressure, according to:

$$\frac{d(\Delta v)}{dP} \approx \frac{v_{P2}}{n} \cdot \frac{d(\Delta n)}{dP}. \quad (7)$$

Typically the birefringent fiber 33 is made by modifying the refractive index of a core and cladding of the birefringent fiber 33. In general, the fiber birefringence of birefringent fiber 33 may vary with respect to any other physical quantities such as temperature and strain. So, any possible cross sensitivity would preferably be discriminated to unambiguously determine the amount of pressure change. For instance, the birefringent fiber 33 can be modified to be insensitive to ambient temperature fluctuation, so the thermal cross sensitivity can be mitigated. The birefringent fiber 33 comprises a core and cladding (not shown); doping the core and/or cladding with certain chemicals (e.g. Boron) will result in a mitigation of the thermal cross sensitivity. Alternatively the birefringent fiber 33 may comprise photonic crystal fibers so that the thermal and strain sensitivity of the fiber birefringence can be mitigated. In addition, temperature/strain responses can be also completely discriminated by performing additional distributed temperature/strain measurements through the same birefringent fiber 33; the distributed temperature/strain measurement is then subtracted from the distributed pressure measurement. Furthermore, the birefringent fiber 33 can be configured to have enhanced birefringence sensitivity to the pressure, for example the birefringent fiber 33 may be configured to be a micro structured fiber. An enhanced birefringence sensitivity will further improve measurement resolution.

Figure 3:
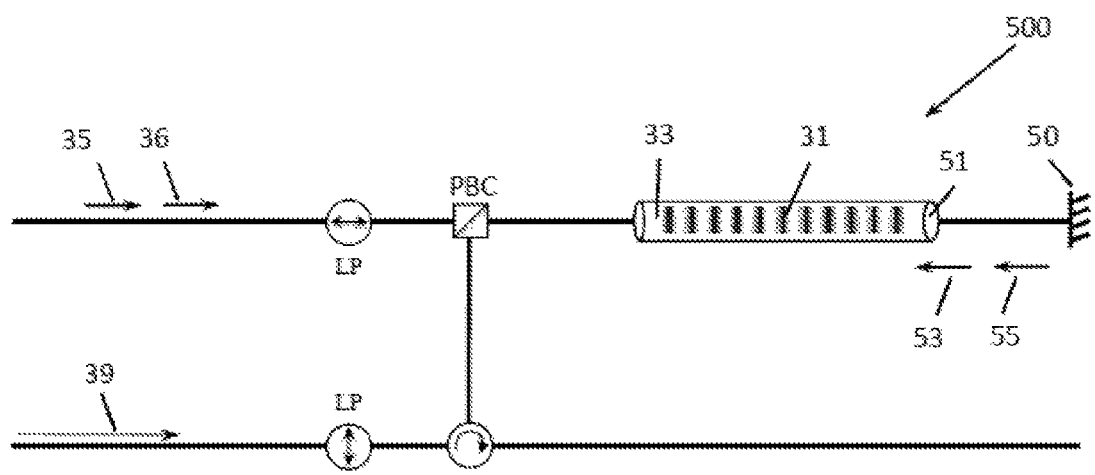
FIG. 3 provides a graphical illustration of a system according to a third embodiment of the present invention suitable for the implementation of a method according to a third embodiment of the present invention.

FIG. 3 illustrates a sensing system 500 according to a third embodiment of the present invention which is configured to implement a third embodiment of method according to the present invention. The sensing system 500 shown in FIG. 3 has many of the same features of the sensing system 300 in FIG. 2 and like features are awarded the same reference numerals.

In sensing system 500, the first and second pump signals 35, 36 co-propagate (i.e. propagate in the same direction) along the birefringent fiber 33. The first and second pump signals 35, 36 are then reflected by a light reflector 50, such as a standard mirror or Faraday rotation mirror, placed at an end 51 of the birefringent fiber 33, to provide first and second reflected signals 53, 55. The first and second pump signals 35, 36 interact with the first and second reflected signals 53, 55 within the birefringent fiber 33 to generate dynamic Brillouin gratings 31 within the birefringent fiber 33.

Following the generation of the dynamic Brillouin gratings 31, the distributed pressure along the birefringent fiber 33 is determined using the same steps as outlined above with respect to FIG. 2.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method of performing distributed pressure sensing comprising the steps of,
    forming a grating in a birefringent fiber and attaching a length of the birefringent fiber to a structure which is to be monitored, wherein the grating is a continuous grating and wherein the grating is continuous along the whole of said length of the birefringent fiber which is attached to the structure to be monitored;
    measuring a birefringence distribution along the whole length of the birefringent fiber, and
    determining distributed pressure present along the length of the fiber using the measured birefringence distribution.

2. The method according to claim 1 wherein the step of forming a grating in a birefringent fiber comprise forming a static grating in a birefringent fiber.

3. The method according to claim 2 wherein the step of forming a static grating in a birefringent fiber comprises providing a birefringent fiber with a plurality of regions wherein a refractive index of the fiber is permanently modulated.

4. The method according to claim 2 comprising the steps of,
    providing a pulsed probe signal, polarized along a primary axis, to the birefringent fiber,
    scanning a frequency of the pulsed probe signal to the measure a first distributed frequency at which maximum scattering is taking place;
    changing the polarization of the pulsed probe signal,
    scanning the frequency of the pulsed probe signal to the measure a second distributed frequency at which maximum scattering is taking place,
    measuring a difference between the first and second distributed frequencies to determine the birefringence of the birefringent fiber,
    repeating the above steps one or more times, and
    detecting a change in pressure applied to the birefringent fiber by detecting a change in the difference between the first and second distributed frequencies.

5. The method according to claim 1 further comprising the step of
    performing distributed temperature and/or strain measurements using the birefringent fiber, and
    subtracting the distributed temperature and/or strain measurements from the distributed pressure measurement.

6. The method according to claim 1 wherein the birefringent fiber is doped with Boron, or is a microstructured fiber, so that the birefringent fiber is configured to be insensitive to ambient temperature fluctuations, so the thermal cross sensitivity can be mitigated, and wherein the birefringent fiber further comprises photonic crystal fibers so that the birefringent fiber is further configured such that the strain sensitivity of the birefringent fiber is mitigated.

7. A sensing device for performing a method of distributed pressure sensing according to claim 1, the sensing device comprising,
    the birefringent fiber, the length of which is to be attached to the structure which is to be monitored, the birefringent fiber comprising the grating, wherein the grating is the continuous grating and wherein the grating is continuous along the whole of said length of the birefringent fiber which is to be attached to the structure to be monitored;

a signal generator, for providing a pulsed probe signal in the birefringent fiber, for measuring birefringence distribution along the length of the birefringent fiber, and a processor for determining the distributed pressure present along the length of the birefringent fiber using the measured birefringence distribution.

8. A method of performing distributed pressure sensing comprising the steps of, forming a grating in a birefringent fiber, wherein the birefringent fiber has length which extends between a first end extremity and a second end extremity, and wherein the grating is a continuous grating and wherein the grating is continuous along the whole of said length of the birefringent fiber which is between the first and second end extremities;

measuring the birefringence distribution along the whole length of the birefringent fiber, and determining distributed pressure present along the length of the fiber using the measured birefringence distribution.

9. The method according to claim 8 wherein the first end extremity is connected to an interrogator which can deliver and receive optical signals to and from the birefringent fiber, and a second end extremity is connected to an interrogator which can deliver and receive optical signals to and from the birefringent fiber.

10. A method of performing distributed pressure sensing comprising the steps of, forming a grating in a birefringent fiber and attaching a length of the birefringent fiber to a structure which is to be monitored;

measuring a birefringence distribution along the whole length of the birefringent fiber, and determining distributed pressure present along the length of the fiber using the measured birefringence distribution, wherein the step of forming a grating in a birefringent fiber comprises forming a dynamic grating in the birefringent fiber.

11. The method according to claim 10 wherein the dynamic grating is formed by Brillouin scattering.

12. The method according to claim 10, wherein the step of forming a dynamic grating in a birefringent fiber comprises counter propagating a first pump signal and a second pump signal in the birefringent fiber so that the first pump signal and a second pump signal interact by stimulated Brillouin scattering within the birefringent fiber, wherein the difference in between the frequencies of the first pump signal and a second pump signal is within the range of the Brillouin frequency shift±an offset, wherein the offset is equal to the spectral width of the stimulated Brillouin scattering within the birefringent fiber.

13. The method according to claim 12 wherein the difference between the frequencies of the first and second pump signals is equal to a Brillouin frequency shift of the birefringent fiber.

14. The method according to claim 12 wherein the first pump signal and second pump signal are polarized along a first primary axis of polarization.

15. The method according to claim 14 further comprising the step of providing a probe signal, polarized along a second primary axis which is orthogonal to the first primary axis, in the birefringent fiber to the measure the frequency at which maximum scattering is taking place.

16. The method according to claim 15 further comprising the step of scanning the frequency of the probe signal to detect shift in the frequency at which maximum scattering is taking place, wherein the shift in frequency is representative of a pressure change.

17. The method according to claim 10 wherein the step of forming a dynamic grating comprises co-propagating a first and second pump signal in the birefringent fiber, reflecting the first and second pump signal using a reflecting means to provide first and second reflected signals, interacting the first and second pump signals with the first and second reflected signals to generate a dynamic Brillouin grating along the birefringent fiber, wherein the difference in between the frequencies of the first pump signal and a second pump signal is within the range of the Brillouin frequency shift±an offset, wherein the offset is equal to the spectral width of the stimulated Brillouin scattering within the birefringent fiber.

* * * * *

UNITED STATES PATENT AND TRADEMARK OFFICE
CERTIFICATE OF CORRECTION

PATENT NO. : 9,726,558 B2
APPLICATION NO. : 14/407644
DATED : August 8, 2017
INVENTOR(S) : Sanghoon Chin et al.

Page 1 of 1

It is certified that error appears in the above-identified patent and that said Letters Patent is hereby corrected as shown below:

In the Specification

Column 9, Line 3 please delete ""$v_g$"" and replace it with -- "$v_S$" --

Signed and Sealed this
Twenty-fourth Day of April, 2018

Andrei Iancu
*Director of the United States Patent and Trademark Office*